(12) United States Patent
Akl et al.

(10) Patent No.: US 11,950,149 B2
(45) Date of Patent: Apr. 2, 2024

(54) INTER-DONOR CELL MANAGEMENT IN INTEGRATED ACCESS AND BACKHAUL

(71) Applicant: QUALCOMM Incorporated, San Diego, CA (US)

(72) Inventors: Naeem Akl, Somerville, NJ (US); Karl Georg Hampel, Hoboken, NJ (US); Navid Abedini, Basking Ridge, NJ (US); Jianghong Luo, Skillman, NJ (US); Luca Blessent, Whitehouse Station, NJ (US); Junyi Li, Franklin Park, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/302,170

(22) Filed: Apr. 26, 2021

(65) Prior Publication Data

US 2021/0345197 A1 Nov. 4, 2021

Related U.S. Application Data

(60) Provisional application No. 63/018,129, filed on Apr. 30, 2020.

(51) Int. Cl.
*H04W 36/00* (2009.01)
*H04W 76/11* (2018.01)
(Continued)

(52) U.S. Cl.
CPC ... *H04W 36/0077* (2013.01); *H04W 36/0033* (2013.01); *H04W 76/11* (2018.02); *H04W 88/14* (2013.01); *H04W 92/14* (2013.01)

(58) Field of Classification Search
CPC ..... H04W 72/04; H04W 88/08; H04W 76/00; H04W 36/0077; H04W 36/0033; H04W 88/14; H04W 76/11; H04W 92/14
See application file for complete search history.

(56) References Cited

U.S. PATENT DOCUMENTS

2019/0357117 A1* 11/2019 Cudak ................... H04W 80/02
2020/0008218 A1*  1/2020 Shih ..................... H04W 72/23
(Continued)

FOREIGN PATENT DOCUMENTS

| WO | WO-2020191768 A1 * | 3/2019 | ............ H04L 29/08 |
|----|--------------------|--------|------------------------|
| WO | WO-2019246446 A1   | 12/2019 | |
| WO | WO-2021109356 A1 * | 10/2021 | ............ H04W 36/00 |

OTHER PUBLICATIONS

International Search Report and Written Opinion—PCT/US2021/070466—ISAEPO—dated Aug. 12, 2021.

*Primary Examiner* — Hassan A Phillips
*Assistant Examiner* — Prenell P Jones
(74) *Attorney, Agent, or Firm* — Harrity & Harrity, LLP

(57) ABSTRACT

Various aspects of the present disclosure generally relate to wireless communication. In some aspects, an integrated access and backhaul (IAB) node may determine a cell configuration of a distributed unit (DU) of the IAB node. The cell configuration may be associated with a second IAB donor. The DU may be one of a set of DUs of the IAB node. The IAB node may have a first signaling connection to a central unit (CU) of a first IAB donor. The IAB node may provide the cell configuration associated with the second TAB donor. Numerous other aspects are provided.

33 Claims, 8 Drawing Sheets

(51) Int. Cl.
    *H04W 88/14*     (2009.01)
    *H04W 92/14*     (2009.01)

(56) References Cited

U.S. PATENT DOCUMENTS

| | | | |
|---|---|---|---|
| 2020/0084688 A1* | 3/2020 | Mildh | H04W 40/24 |
| 2020/0137611 A1* | 4/2020 | Majmundar | H04W 40/12 |
| 2021/0058989 A1* | 2/2021 | Simsek | H04L 47/283 |
| 2021/0119920 A1* | 4/2021 | Tesanovic | H04L 47/12 |
| 2021/0168667 A1* | 6/2021 | Byun | H04W 36/02 |
| 2021/0195541 A1* | 6/2021 | Wei | H04W 56/005 |
| 2021/0227435 A1 | 7/2021 | Hsieh | |
| 2021/0352607 A1* | 11/2021 | Miao | H04W 56/0045 |
| 2022/0104088 A1* | 3/2022 | Byun | H04W 36/023 |
| 2022/0166703 A1* | 5/2022 | Xu | H04L 61/50 |
| 2022/0312287 A1* | 9/2022 | Koskinen | H04W 36/08 |
| 2022/0361067 A1* | 11/2022 | Koskinen | H04W 36/0061 |

* cited by examiner

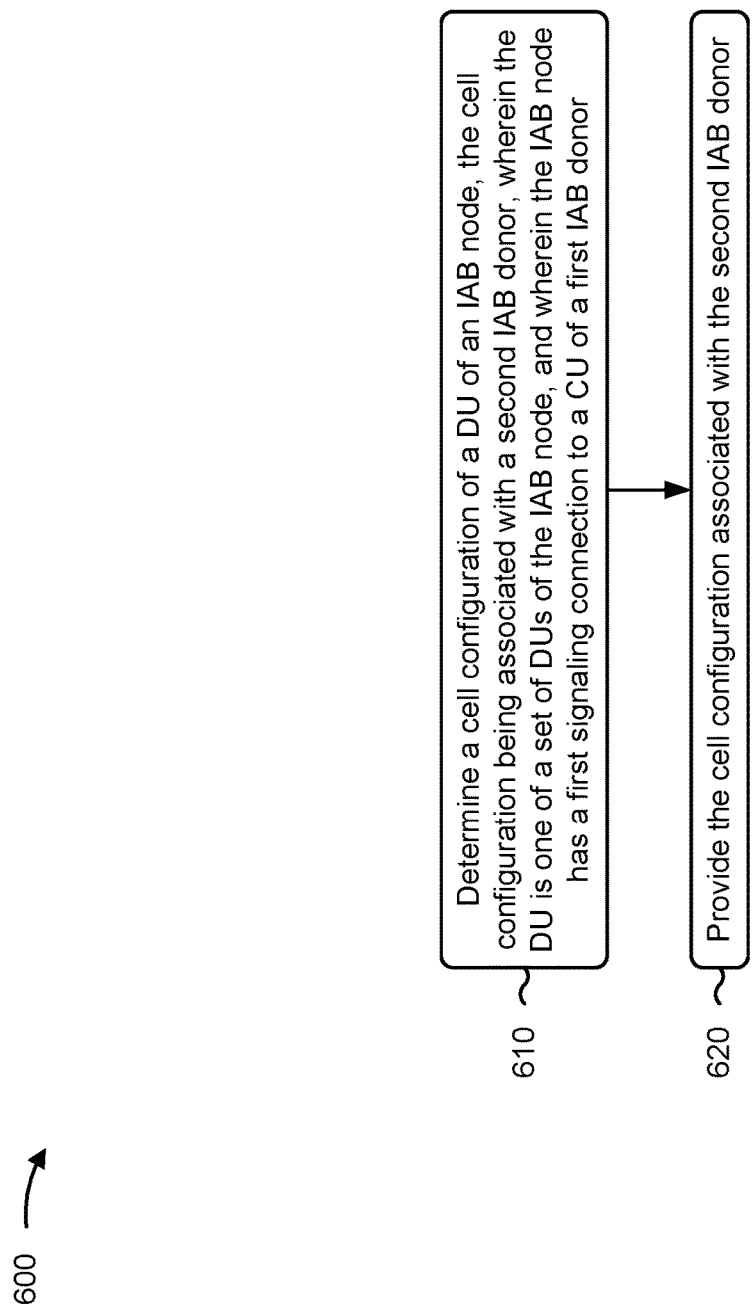

INTER-DONOR CELL MANAGEMENT IN INTEGRATED ACCESS AND BACKHAUL

CROSS-REFERENCE TO RELATED APPLICATION

This patent application claims priority to U.S. Provisional Patent Application No. 63/018,129, filed on Apr. 30, 2020, entitled "INTER-DONOR CELL MANAGEMENT IN INTEGRATED ACCESS AND BACKHAUL," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for inter-donor cell management in integrated access and backhaul (IAB).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by an integrated access and backhaul (IAB) node, may include determining a cell configuration of a distributed unit (DU) of the IAB node, the cell configuration being associated with a second IAB donor, wherein the DU is one of a set of DUs of the IAB node, and wherein the IAB node has a first signaling connection to a central unit (CU) of a first IAB donor; and providing the cell configuration associated with the second IAB donor.

In some aspects, a method of wireless communication, performed by an IAB donor, may include receiving a cell configuration of a DU of an IAB node, the cell configuration being associated with a second IAB donor, wherein the DU is one of a set of DUs of the IAB node, and wherein the IAB node has a first signaling connection to a CU of a first IAB donor; and performing one or more operations associated with a context transfer, associated with a child of the IAB node, from the first IAB donor to the second IAB donor based at least in part on the cell configuration.

In some aspects, an IAB node for wireless communication may include a memory and one or more processors coupled to the memory. The memory and the one or more processors may be configured to determine a cell configuration of a DU of the IAB node, the cell configuration being associated with a second IAB donor, wherein the DU is one of a set of DUs of the IAB node, and wherein the IAB node has a first signaling connection to a CU of a first IAB donor; and provide the cell configuration associated with the second IAB donor.

In some aspects, an IAB donor for wireless communication may include a memory and one or more processors coupled to the memory. The memory and the one or more processors may be configured to receive a cell configuration of a DU of an IAB node, the cell configuration being associated with a second IAB donor, wherein the DU is one of a set of DUs of the IAB node, and wherein the IAB node has a first signaling connection to a CU of a first IAB donor; and perform one or more operations associated with a context transfer, associated with a child of the IAB node, from the first IAB donor to the second IAB donor based at least in part on the cell configuration.

In some aspects, a non-transitory computer-readable medium may store one or more instructions for wireless communication. The one or more instructions, when executed by one or more processors of an IAB node, may cause the one or more processors to determine a cell configuration of a DU of the IAB node, the cell configuration being associated with a second IAB donor, wherein the DU is one of a set of DUs of the IAB node, and wherein the IAB node has a first signaling connection to a CU of a first IAB donor; and provide the cell configuration associated with the second IAB donor.

In some aspects, a non-transitory computer-readable medium may store one or more instructions for wireless communication. The one or more instructions, when executed by one or more processors of an IAB donor, may cause the one or more processors to receive a cell configuration of a DU of an IAB node, the cell configuration being associated with a second IAB donor, wherein the DU is one of a set of DUs of the IAB node, and wherein the IAB node has a first signaling connection to a CU of a first IAB donor; and perform one or more operations associated with a context transfer, associated with a child of the IAB node, from the first IAB donor to the second IAB donor based at least in part on the cell configuration.

In some aspects, an apparatus for wireless communication may include means for determining a cell configuration of a DU of the apparatus, the cell configuration being associated with a second IAB donor, wherein the DU is one of a set of DUs of the apparatus, and wherein the apparatus has a first signaling connection to a CU of a first IAB donor; and means for providing the cell configuration associated with the second IAB donor.

In some aspects, an apparatus for wireless communication may include means for receiving a cell configuration of a DU of an IAB node, the cell configuration being associated with a second IAB donor, wherein the DU is one of a set of DUs of the IAB node, and wherein the IAB node has a first signaling connection to a CU of a first IAB donor; and means for performing one or more operations associated with a context transfer, associated with a child of the IAB node, from the first IAB donor to the second IAB donor based at least in part on the cell configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by an IAB node, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
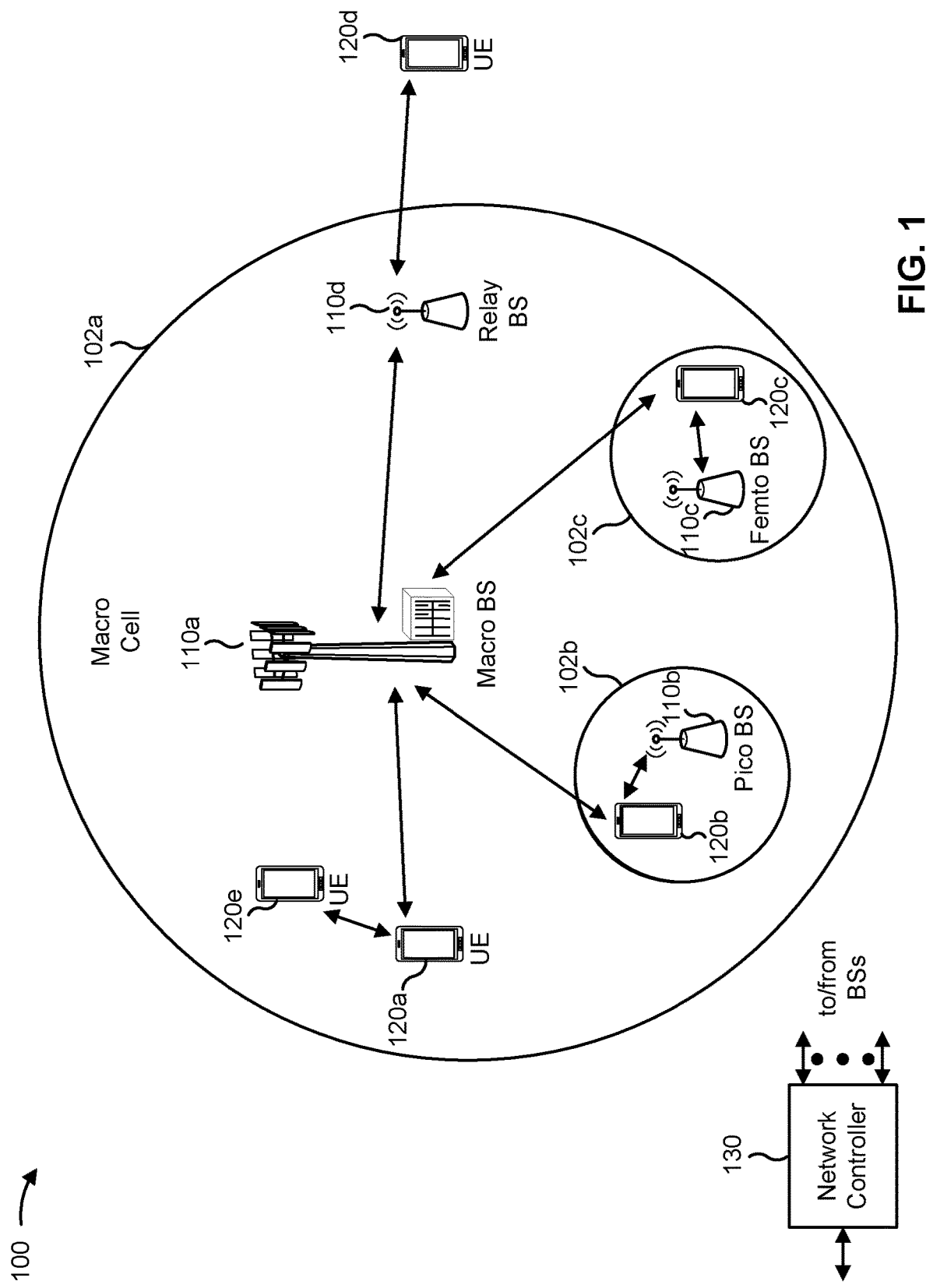
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peerto-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
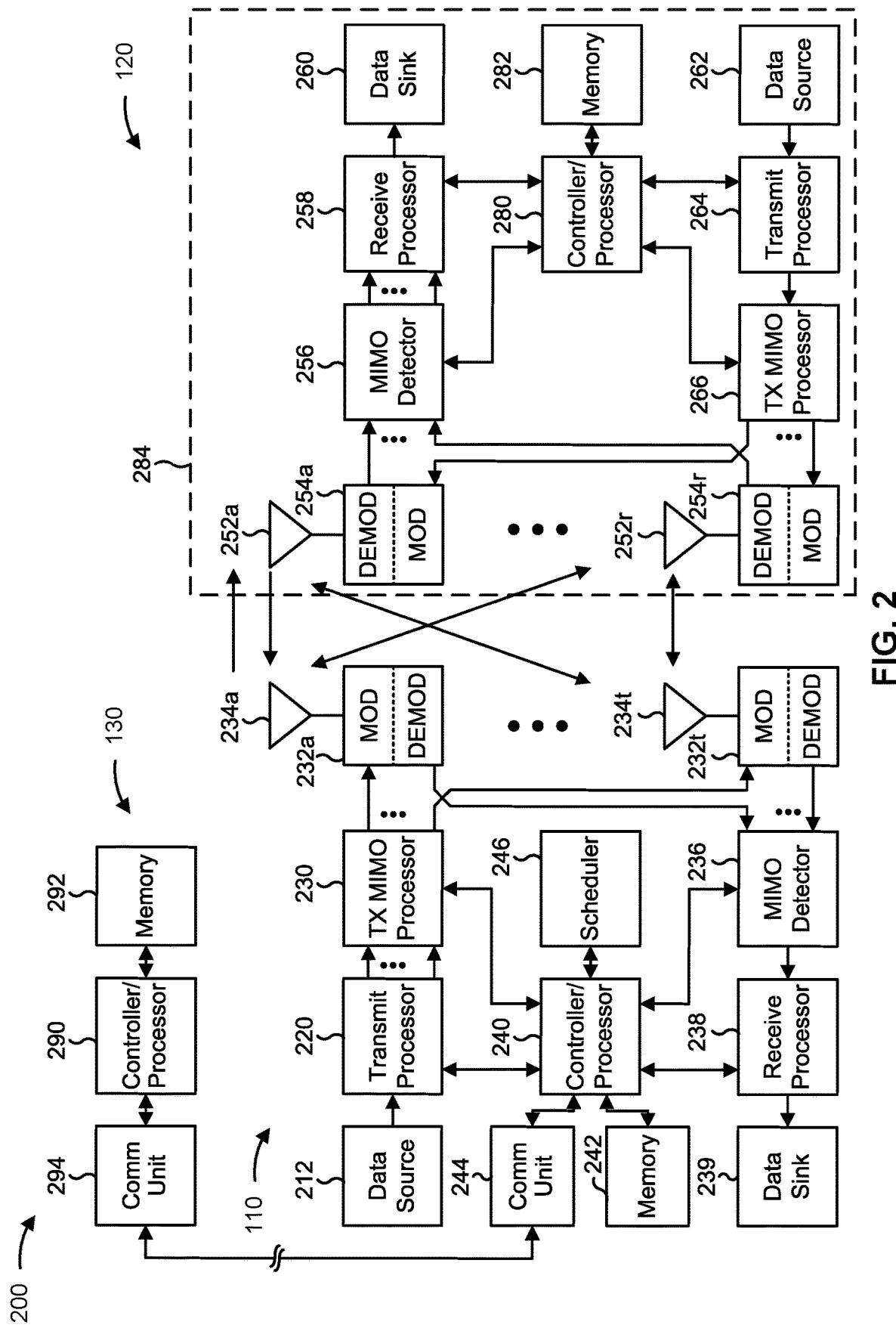
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5A and 5B, 6, and 7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5A and 5B, 6, and 7.

Controller/processor 240 of base station 110, controller/processor 280 of UE 120, and/or any other component(s) of FIG. 2 may perform one or more techniques associated with inter-donor cell management in IAB, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, a base station (e.g., base station 110) may include an IAB node (e.g., an IAB node 410) that includes means for determining a cell configuration of a DU of the IAB node, the cell configuration being associated with a second IAB donor (e.g., a second base station 110, a second IAB donor 405, and/or the like), wherein the DU is one of a set of DUs of the IAB node, and wherein the IAB node has a first signaling connection to a CU of a first IAB donor (e.g., a first base station 110, a first IAB donor 405); means for providing the cell configuration associated with the second IAB donor; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a base station (e.g., a base station 110) may include an IAB donor (e.g., an IAB donor 405) that includes means for receiving a cell configuration of a DU of an IAB node (e.g., a base station 110, an IAB node 410, and/or the like), the cell configuration being associated with a second IAB donor (e.g., a second base station 110, a second IAB donor 405, and/or the like), wherein the DU is one of a set of DUs of the IAB node, and wherein the IAB node has a first signaling connection to a CU of a first IAB donor (e.g., a first base station 110, a first IAB donor 405, and/or the like); means for performing one or more operations associated with a context transfer, associated with a child of the IAB node, from the first IAB donor to the second IAB donor based at least in part on the cell configuration; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
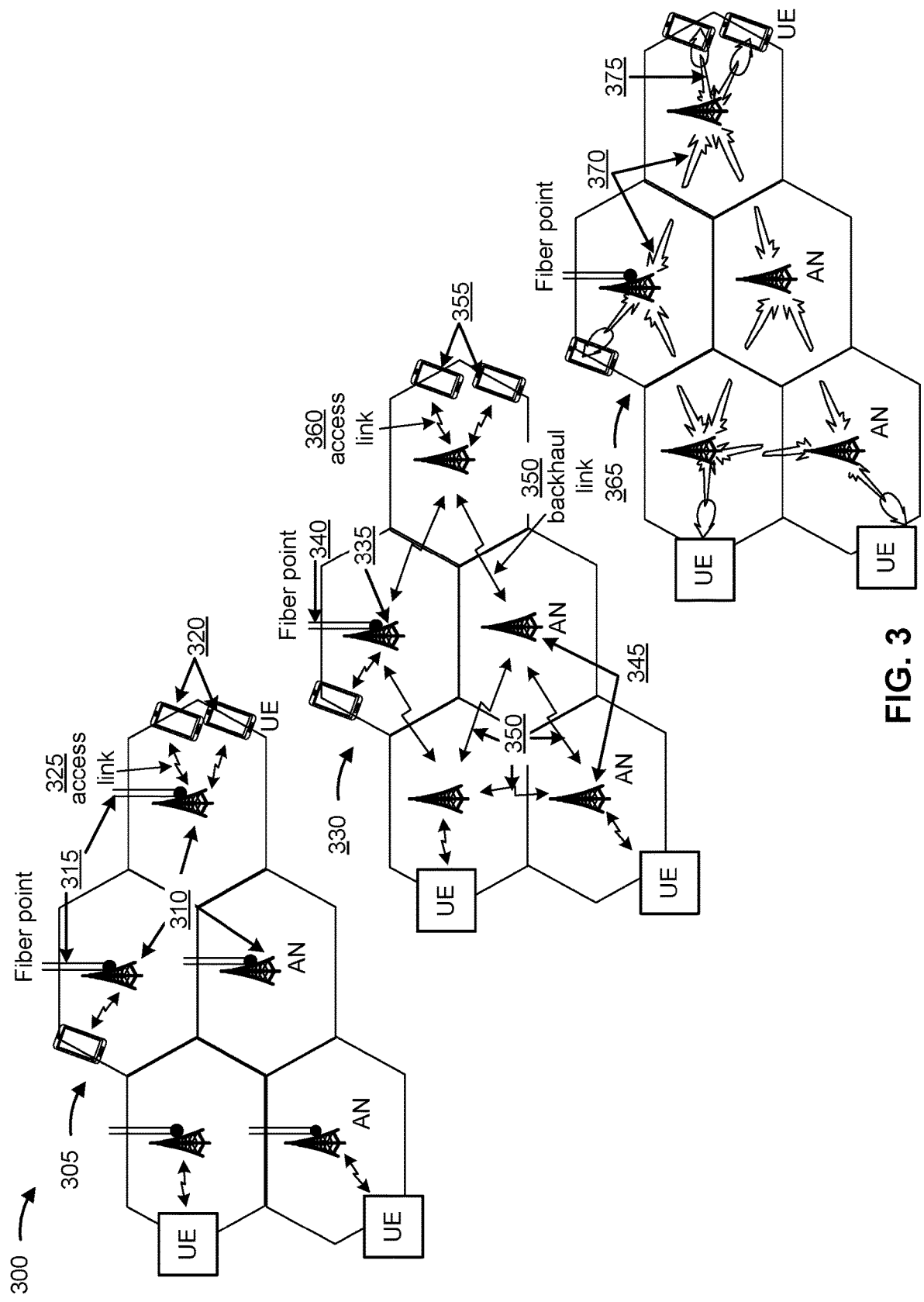
FIG. 3 is a diagram illustrating examples of radio access networks, in accordance with the disclosure.

FIG. 3 is a diagram illustrating examples 300 of radio access networks, in accordance with the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 370 between base stations (e.g., base stations 110) may use millimeter wave signals to carry information and/or may be directed toward a target base station (e.g., a base station 110) using beamforming and/or the like. Similarly, the wireless access links 375 between a UE (e.g., a UE 120) and a base station (e.g., a base station 110) may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, "anchor node" may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
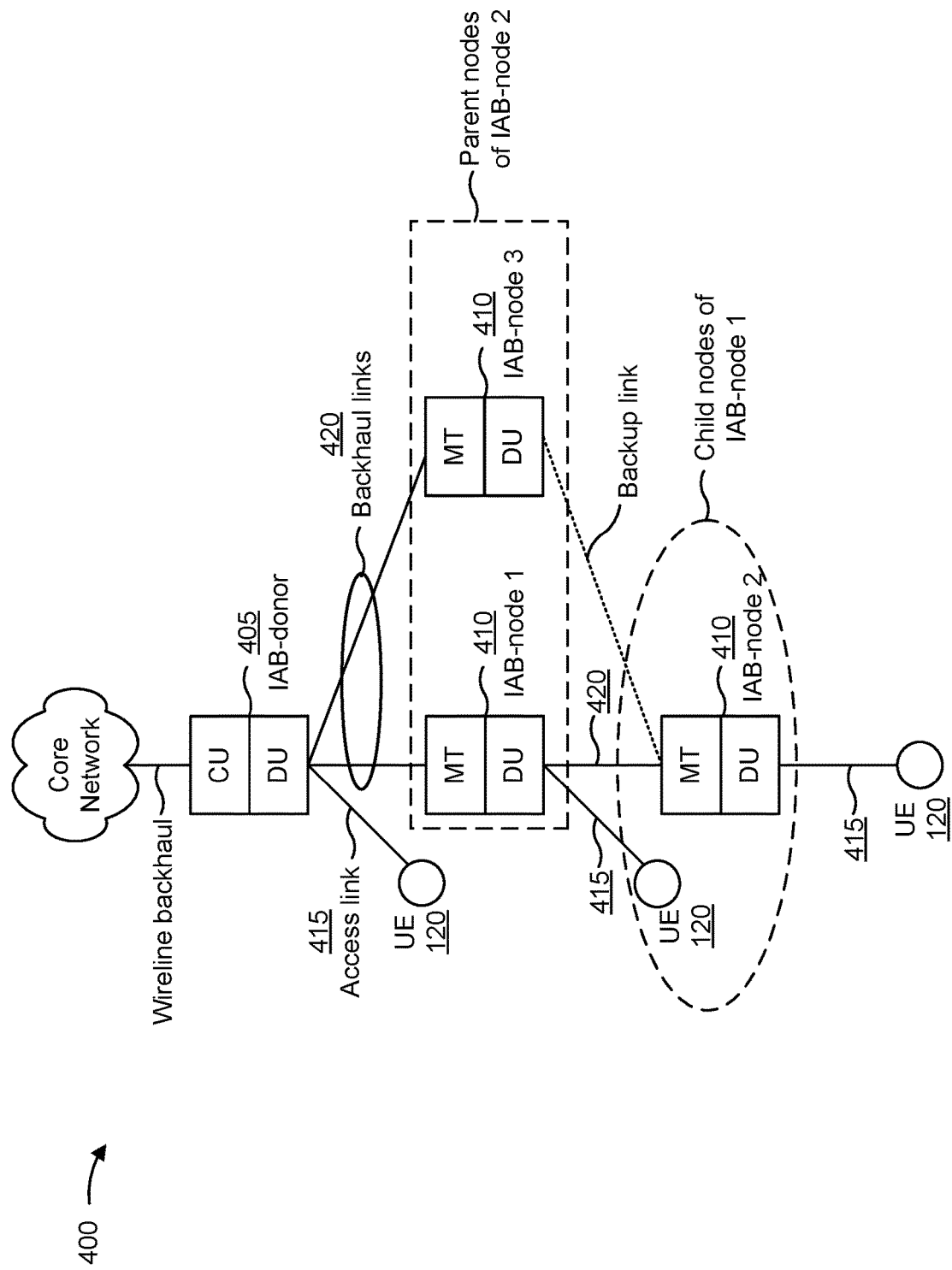
FIG. 4 is a diagram illustrating an example of an IAB network architecture, in accordance with the disclosure.

FIG. 4 is a diagram illustrating an example 400 of an IAB network architecture, in accordance with the disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station, as described above in connection with 3. As shown, an IAB donor 405 may include a central unit (CU), which may perform access node controller (ANC) functions, AMF functions, and/or the like. The CU may configure one or more distributed units (DUs) of the IAB donor 405 and/or may configure one or more IAB nodes 410 (e.g., an MT and/or one or more DUs of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message, an F1 application protocol (F1AP) message, and/or the like).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, spatial resources, and/or the like) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, becomes overloaded, and/or the like. For example, a backup link 425 between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

As indicated above, FIG. 4 is provided as an example. Other examples may differ from what is described with regard to FIG. 4.

In an IAB network, a CU of an IAB donor (e.g., a base station 110, an IAB donor 405) may communicate with a DU over an F1 connection (e.g., a connection on an F1 interface). The DU may be, for example, a DU of the IAB donor or a DU of an IAB node (e.g., another base station 110, an IAB node 410). The F1 connection may be used, for example, to exchange control plane messages. To establish an F1 connection, the DU sends, to the CU, an F1 setup request message including a list of cells that are configured on the DU and ready to be activated. The CU sends, to the DU, an F1 setup response message that optionally includes a list of cells to be activated. Here, each served cell on the DU is identified by a cell global identity (CGI) and a physical cell identifier (PCI) (i.e., a CGI-PCI pair).

As indicated above, the CGI is an identifier of a cell at a DU (e.g., a DU of an IAB donor or a DU of an IAB node). In an NR network, the CGI is referred to as an NR-CGI (NCGI), and includes a public land mobile network (PLMN) identifier, and an NR cell identifier (NCI). The PLMN identifier includes a mobile country code (MCC) and a mobile network code (MNC), while the NCI includes a base station identifier (e.g., a gNB-ID) and local cell identifier. The base station identifier is unique to a base station and, thus, is common for all cells (e.g., at IAB donor DUs and IAB node DUs) served by the base station. Equivalently, the PLMN identifier plus the base station identifier globally identifies the base station. The PCI is an identifier for a cell. Notably, there are a limited number of possible PCI values supported in a 5G system. Therefore, the same PCI can be reused by multiple cells (e.g., cells in geographically separated cells). Multiple cells having the same PCI can be distinguished by their CGIs (e.g., NCGIs). In an NR network, the PCI is broadcast by a base station in a synchronization signal (e.g., a primary synchronization signal (PSS), a secondary synchronization signal (SSS), and/or the like) within a synchronization signal block (SSB) and can be used to determine a scrambling sequence of some physical signals and/or physical channels (e.g., a physical broadcast channel (PBCH), a physical downlink control channel (PDCCH) control resource set 0 (CORESET0), a cell-specific physical downlink shared channel (PDSCH) transmission, and/or the like).

Generally, in an IAB network, a CU can be connected to one or more DUs, but a given DU can be connected to only one CU. Some exceptions include a network sharing scenario with multiple cell identity broadcasts where each cell identity associated with a subset of PLMNs corresponds to a DU and the CU that the DU is connected to (i.e., the corresponding DUs share the same physical layer cell resources) or a scenario in which a DU is connected to multiple CUs by an appropriate implementation for the purpose of resiliency.

In some deployments, an IAB node includes multiple physical DUs, and each of the multiple physical DUs can have an F1 connection to a respective one of multiple IAB donor CUs. Additionally, in some deployments, an IAB node includes a single physical DU but multiple logical DUs, and each of the multiple logical DUs can have an F1 connection to a respective one of multiple IAB donor CUs. In a scenario in which an IAB node has multiple DUs (e.g., multiple physical DUs and/or multiple logical DUs on a single physical DU), a cell configuration associated with a first F1 interface instance towards a CU of a first IAB donor may need to be shared with a CU of a second IAB donor on a second F1 interface instance associated with the CU of the second IAB donor (i.e., on the F1 interface instance that terminates at the same IAB node). The cell configuration may be needed, for example, to perform one or more operations associated with a context transfer, associated with a child of the IAB node, from the first IAB donor to the second IAB donor (e.g., a handover, a secondary node (SN) addition, an SN change, and/or the like).

Some aspects described herein provide techniques and apparatuses for inter-donor cell management in IAB. In some aspects, an IAB node may determine a cell configuration of a DU of the IAB node, where the cell configuration is associated with a second IAB donor and the IAB node has a first signaling connection to a CU of a first IAB donor. The IAB node may provide the cell configuration associated with the second IAB donor (e.g., to the first IAB donor and/or to the second IAB donor). In some aspects, an IAB donor (e.g., the first IAB donor or the second IAB donor) may receive the cell configuration of the DU) of the IAB node, and may perform one or more operations associated with a context transfer, associated with a child of the IAB node, from the first IAB donor to the second IAB donor based at least in part on the cell configuration. Additional details are provided below.

Figure 5A:
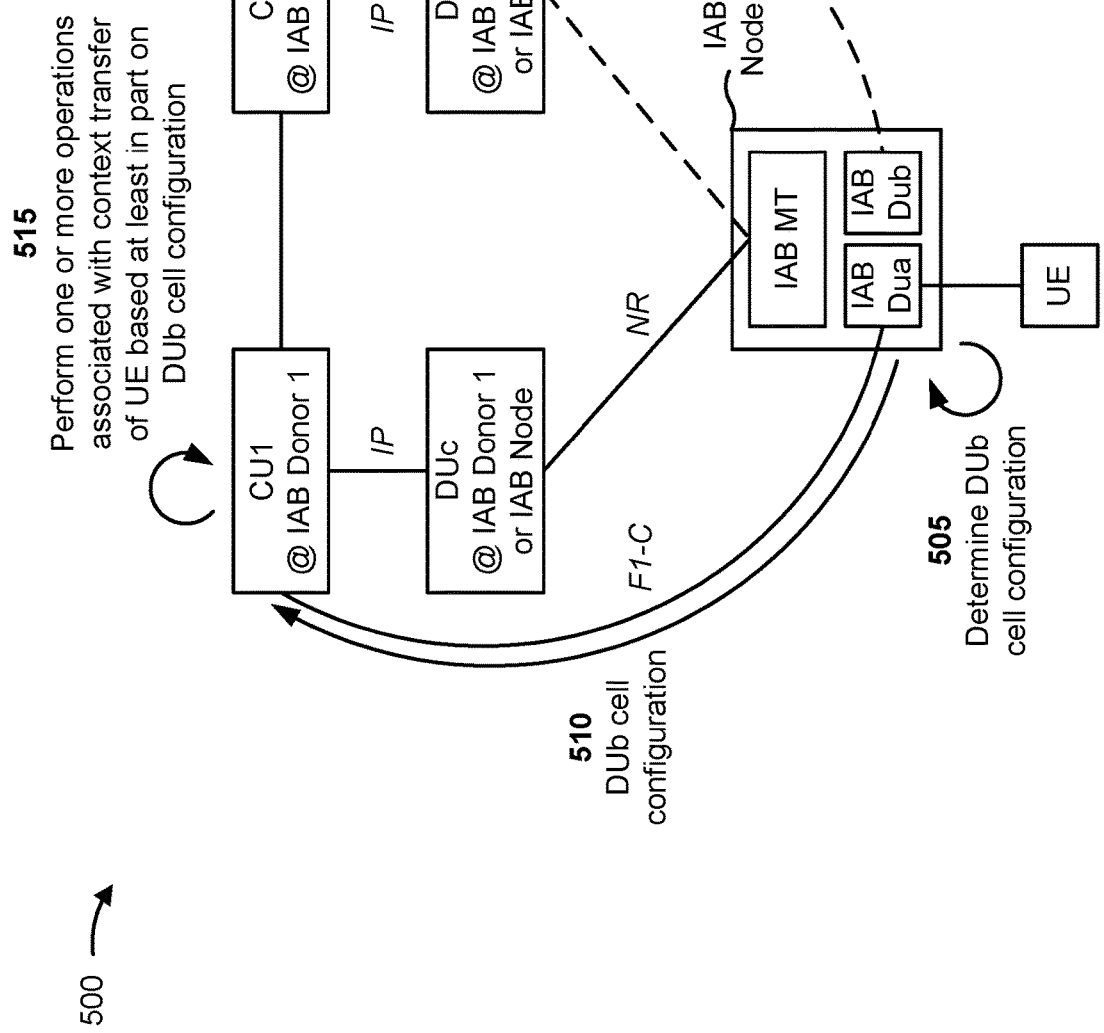
FIGS. 5A and 5B are diagrams illustrating examples associated with inter-donor cell management in IAB, in accordance with the present disclosure.
Figure 5B:
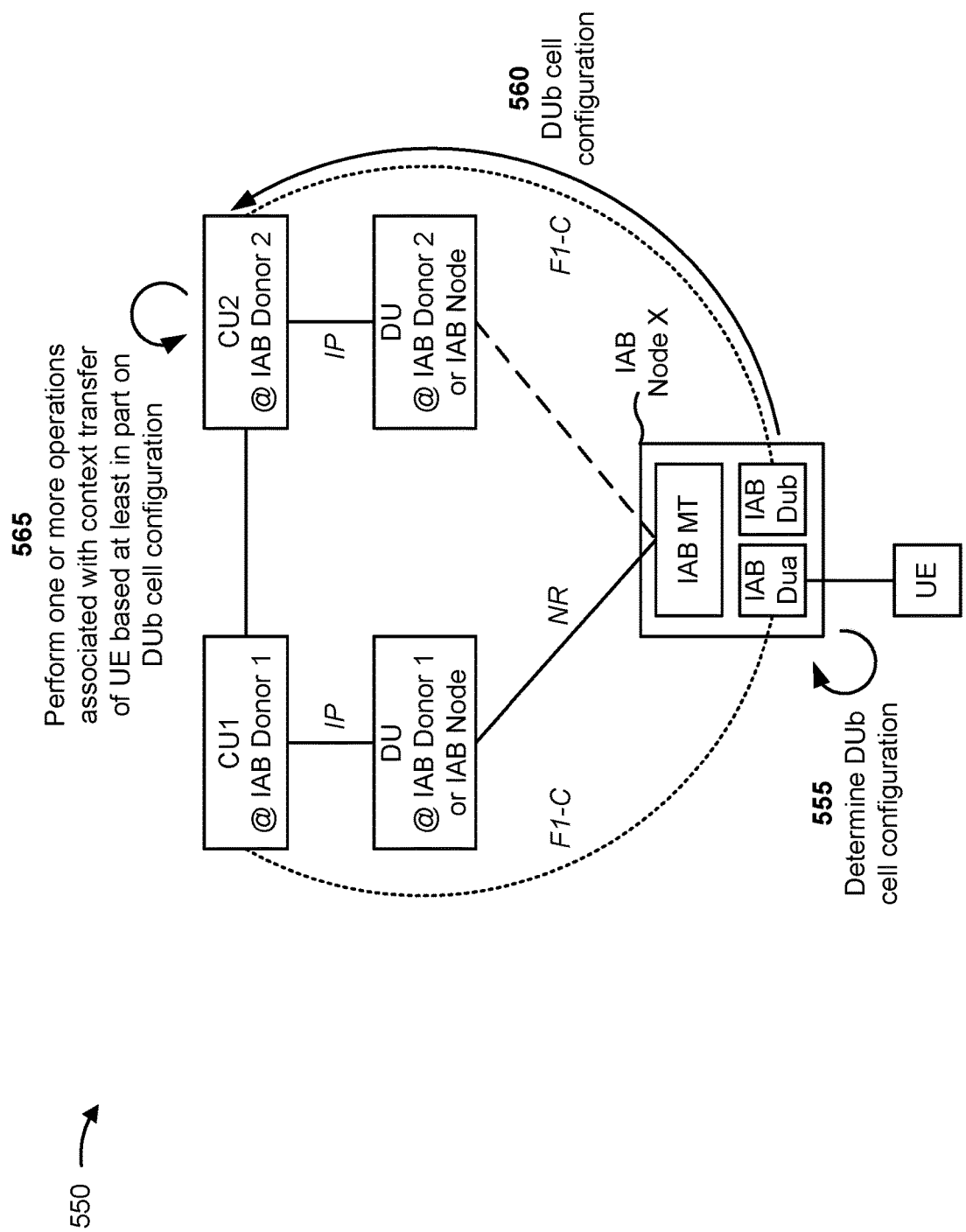

FIGS. 5A and 5B are diagrams illustrating examples 500 and 550, respectively, associated with inter-donor cell management in IAB, in accordance with the present disclosure. In the IAB network shown in FIGS. 5A and 5B, an IAB node (e.g., a base station 110, an IAB node 410, and/or the like) includes an MT and a set of DUs including DUa and DUb. Here, DUa and DUb may be separate logical DUs implemented on a single physical DU, or may be separate physical DUs of the IAB node. As indicated, a UE (e.g., a UE 120) is connected to a cell activated on DUa.

As further shown, a first IAB donor (identified as IAB donor 1) includes a first CU (identified as CU1). The first CU is connected (e.g., via an IP connection) to a DU identified as DUc. Here, DUc may be a DU of the first IAB donor or may be a DU of another IAB node (e.g., an IAB node that is between the IAB node and the first IAB donor in the IAB network). Similarly, a second IAB donor (identified as IAB donor 2) includes a second CU (identified as CU2). The second CU is connected (e.g., via an IP connection) to a DU identified as DUd. Here, DUd may be a DU of the second IAB donor or may be a DU of another IAB node (e.g., an IAB node that is between the IAB node and the second IAB donor in the IAB network).

As further shown, an MT of the IAB node has a connection (e.g., an NR connection) with DUc. Further, in this example, DUa has a first signaling connection (e.g., an F1 connection) with the first CU of the first IAB donor. In some aspects, the first signaling connection may include an F1 connection (i.e., a connection over an F1 interface), as indicated in FIGS. 5A and 5B. Additionally, or alternatively, the first signaling connection may include an RRC connection.

As shown by reference 505 in FIG. 5A and by reference 555 in FIG. 5B, the IAB node may determine a cell configuration of DUb of the IAB node. In some aspects, the cell configuration is associated with the second IAB donor.

In some aspects, the IAB node may determine the cell configuration based at least in part on the cell configuration being received from the second CU of the second IAB donor. For example, the IAB node may receive the cell configuration on a second signaling connection. In some aspects, the second signaling connection may include an F1 connection (e.g., between the second CU and DUb) and/or an RRC connection. In some aspects, the IAB node may receive the cell configuration from the second CU of the second IAB donor based at least in part on a request provided to the second CU of the second IAB donor on the second signaling connection. In some aspects, the cell configuration may be received by DUb, DUa, or another DU of the IAB node (not shown).

In some aspects, the IAB node may determine the cell configuration based at least in part on the cell configuration being received from the first CU of the first IAB donor. For example, the IAB node may receive the cell configuration on the first signaling connection. In some aspects, the IAB node may receive the cell configuration from the first CU of the first IAB donor based at least in part on a request provided to the first CU of the first IAB donor on the first signaling connection. In some aspects, the cell configuration may be received by DUa, DUb, or another DU of the IAB node (not shown).

In some aspects, the IAB node may determine the cell configuration based at least in part on the cell configuration being configured on the IAB node by a network operator. That is, in some aspects, the cell configuration may be preconfigured by the network operator on the IAB node.

Notably, the manner in which the IAB node determines the cell configuration (e.g., based at least in part on being received from the second CU, based at least in part on being received from the first CU, and/or based at least in part on configuration by the network operator) may depend upon a network entity (e.g., the first IAB donor, the second IAB donor, or the network operator) that is responsible for reconfiguration of cells when the IAB node moves from a base station of the first IAB donor to a base station of the second IAB donor.

In some aspects, the cell configuration includes configuration information associated with one or more cells served by and/or activated on a DU of the IAB node and/or information associated with the second IAB donor. For example, in some aspects, the cell configuration may be associated with one or more cells served by DUb and/or one or more cells activated by the second IAB donor on DUb.

As another example, in some aspects, the cell configuration includes a CGI (e.g., an NCGI, an E-UTRA CGI, and/or the like) that includes an identifier (e.g., a gNB identifier, an ng-eNB identifier, and/or the like) of the second IAB donor.

As another example, in some aspects, the cell configuration includes a PCI associated with a cell served by DUb or activated on DUb.

As another example, in some aspects, the cell configuration includes mapping information associated with mapping a CGI or a PCI to a cell associated with the first IAB donor and served by a particular DU of the IAB node (e.g., DUb, DUa, or another DU of the IAB node).

As another example, in some aspects, the cell configuration includes mapping information associated with mapping a CGI or a PCI to a cell associated with the first IAB donor and activated by the first CU of the first IAB donor on a particular DU of the IAB node (e.g., DUb, DUa, or another DU of the IAB node).

As another example, in some aspects, the cell configuration includes activation status information associated with one or more cells served by DUb (e.g., information indicating whether a given cell is activated).

As another example, in some aspects, the cell configuration includes cell information associated with a cell served by or activated on DUb. The cell information associated with the cell may include information that indicates, for example, a PLMN identifier, an area code associated with the cell, a frequency associated with the cell, a bandwidth associated with the cell, a direction (e.g., uplink, downlink, and/or the like) associated with the cell, a size associated with the cell, a mode associated with the cell (e.g., time-division duplexing (TDD) mode, frequency division duplexing (FDD) mode), a TDD configuration associated with the cell, a measurement timing configuration associated with the cell, access information associated with the cell, or connectivity support information associated with the cell (e.g., an indication of whether dual connectivity is supported), and/or another type of information.

In some aspects, when the IAB node receives the cell configuration from the second IAB donor, the cell configuration may be based at least in part on a cell configuration associated with the first IAB donor. That is, when the second CU of the second IAB donor is to provide the cell configuration to the IAB node, the cell configuration may be determined (e.g., by the second IAB donor) based at least in part on another cell configuration associated with the first IAB donor. In some aspects, the IAB node may receive the other cell configuration from the first CU of the first IAB donor (e.g., on the first signaling connection), and may provide the other cell configuration to the second CU of the second IAB donor (e.g., on the second signaling connection). In some aspects, the IAB node may provide the other cell configuration to the second CU of the second IAB donor based at least in part on the second signaling connection being established with the second IAB donor. That is, in some aspects, the establishment of the second signal connection may trigger the IAB node to provide the other cell configuration to the second donor CU.

In some aspects, the cell configuration may be based at least in part on a cell mapping associated with the other cell configuration. That is, in some aspects, the cell configuration may be based at least in part on a cell mapping (e.g., performed by the second CU, the first CU, or the IAB node) association with generating mapping information (e.g., mapping information associated with mapping a CGI or a PCI to a cell associated with the first IAB donor and served by a particular DU of the IAB node, or mapping information associated with mapping a CGI or a PCI to a cell associated with the first IAB donor and activated by the first CU of the first IAB donor on a particular DU of the IAB node). In some aspects, the cell configuration may be based at least in part on changing a PCI included in the other cell configuration. That is, in some aspects, the cell configuration may be based at least in part on a PCI change (e.g., performed by the second CU, the first CU, or by the IAB node) performed in association with preventing a PCI collision. In some aspects, the cell configuration includes a PCI included in the other cell configuration. That is, in some aspects, a PCI change may not be performed in association with generating the cell configuration, meaning that a PCI in the cell configuration may match a PCI included in the other cell configuration, which may reduce service disruption at child MTs and/or child UEs of the IAB node.

In some aspects, after determining the cell configuration associated with the second IAB donor, the IAB node may provide the cell configuration. For example, as shown by reference 510 in FIG. 5A, the IAB node may provide the cell configuration to the first CU of the first IAB donor, in some aspects (e.g., when the IAB node receives the cell configuration from the second CU or when the IAB node determines the cell configuration). In some aspects, the IAB node may provide the cell configuration to the first CU on the first signaling connection, on an RRC connection, via DUc, and/or in another manner. In some aspects, the IAB node may provide the cell configuration to the first CU based at least in part on establishment of the second signaling connection. In some aspects, the IAB node may provide the cell configuration to the first CU based at least in part on an addition, a deletion, or a change of a configuration of a cell (e.g., a served cell or an activated cell) associated with the second IAB donor. In some aspects, the IAB node may provide the cell configuration to the first CU based at least in part on a request received from the first CU. In some aspects, the IAB node may provide the cell configuration to the first CU based at least in part on a configuration provided by the first CU (e.g., the cell configuration may be provided as configured by the first CU).

As another example, as shown by reference 560 in FIG. 5B, the IAB node may provide the cell configuration to the second CU of the second IAB donor, in some aspects (e.g., when the IAB node receives the cell configuration from the first CU or when the IAB node determines the cell configuration). In some aspects, the IAB node may provide the cell configuration to the second CU on the second signaling connection, on an RRC connection, via DUd, and/or in another manner. In some aspects, the IAB node may provide the cell configuration to the second CU based at least in part on establishment of the second signaling connection. In some aspects, the IAB node may provide the cell configuration to the second CU based at least in part on a request received from the second CU. In some aspects, the IAB node may provide the cell configuration to the second CU based at least in part on a configuration provided by the second CU (e.g., the cell configuration may be provided as configured by the second CU).

In some aspects, the IAB donor to which the cell configuration is provided (e.g., the first CU of the first IAB donor or the second CU of the second IAB donor) may receive the cell configuration, and may perform one or more operations associated with a context transfer of a child, associated with the IAB node, from the first IAB donor to the second IAB donor based at least in part on the cell configuration.

For example, as shown by reference 515 in FIG. 5A, when the IAB node provides the cell configuration to the first CU, the first CU may receive the cell configuration and may perform one or more operations associated with a context transfer of the UE (i.e., the child of the IAB node connected to cell activated on DUa) from the first IAB donor to the second IAB donor. As a particular example, in some aspects, since the UE is initially connected to the first IAB donor, the first CU may initiate the context transfer of the UE and may indicate a target cell for the UE associated with the context transfer. In some aspects, the first CU may perform the one or more operations based at least in part on the cell configuration (e.g., received in the manner described in association with FIG. 5A). As another example, as shown by reference 565 in FIG. 5B, when the IAB node provides the cell configuration to the second CU, the second CU may receive the cell configuration and may perform one or more operations associated with a context transfer of the UE from the first IAB donor to the second IAB donor. As a particular example, in some aspects, the second CU may identify the target cell indicated by the first CU and may acknowledge the context transfer of the UE. In some aspects, the second CU may perform the one or more operations based at least in part on the cell configuration (e.g., received in the manner described in association with FIG. 5B).

In some aspects, the context transfer includes a handover (e.g., a handover of the UE from a cell of DUa to a cell of DUb). In some aspects, the context transfer includes addition of the second IAB donor as an SN. For example, the first IAB donor may be a master node (MN) and the context transfer may include adding the second IAB donor as an SN. In some aspects, the context transfer includes changing an SN from the first IAB donor to the second IAB donor. For example, a third IAB donor (not shown) may be an MN and the first IAB donor may be an SN. Here, the context transfer may include changing the SN from being the first IAB donor to being the second IAB donor.

In some aspects, the techniques described in association with FIGS. 5A and 5B may be used in association with providing a cell configuration, associated with a second IAB node, for enabling inter-donor cell management in an IAB network. For example, an IAB node may be a mobile node moving from a territory of a first base station (a first IAB donor with a first CU) to a territory of a second base station (a second IAB donor with a second CU). Here, the IAB node may have a first DU and a second DU, where the first DU has a connection to the first CU. In this example, the second DU may provide, to the second CU, a list of served cells of which the second CU activates a subset. Further, the second DU of the IAB node may provide, to the second CU, a cell configuration associated with the first IAB donor (e.g., a list of cells activated on the first DU by the first CU). Based at least in part on the cell configuration, the second CU may then activate a mapped PCI list such that PCI collision is avoided and PCI change is minimized. The second CU can then provide a mapped NCGI list in which new NCGIs carry a base station identifier of the second base station. In this way, the CUs are enabled to manage an NCGI change (e.g., rather than pre-configuring one NCGI list per base station on the DU of the IAB node).

As another example, an IAB node may be a stationary node at a border of a first base station (a first IAB donor with a first CU) to a territory of a second base station (a second IAB donor with a second CU). Here, the IAB node may have a first DU and a second DU, and an MT of the IAB node may have an RRC connection to the first CU. In this example, the first DU may provide, to the first CU, a list of served cells of which the first CU activates a subset. Further, the first DU of the IAB node may provide, to the first CU, a cell configuration associated with the second IAB donor (e.g., a list of cells activated on the second DU of the IAB node by the second CU on a previously established F1 connection). Based at least in part on the cell configuration, the first CU can then indicate a target NCGI on the second DU in a UE context transfer to the second CU triggered by, for example, a handover, an SN addition, or an SN change of the MT of the IAB node (or an MT of an upstream IAB node) to the second CU.

As indicated above, FIGS. 5A and 5B are provided as examples. Other examples may differ from what is described with respect to FIGS. 5A and 5B.

FIG. 6 is a diagram illustrating an example process 600 performed, for example, by an IAB node, in accordance with the present disclosure. Example process 600 is an example where the IAB node (e.g., a base station 110, an IAB node 410, and/or the like) performs operations associated with inter-donor cell management in IAB.

As shown in FIG. 6, in some aspects, process 600 may include determining a cell configuration of a DU of the IAB node, the cell configuration being associated with a second IAB donor, wherein the DU is one of a set of DUs of the IAB node, and wherein the IAB node has a first signaling connection to a CU of a first IAB donor (block 610). For example, the IAB node (e.g., using transmit processor 220, receive processor 238, controller/processor 240, memory 242, and/or the like) may determine a cell configuration of a DU of the IAB node, the cell configuration being associated with a second IAB donor (e.g., a second base station 110, a second IAB donor 405, and/or the like), as described above. In some aspects, the DU is one of a set of DUs of the IAB node. In some aspects, the IAB node has a first signaling connection to a CU of a first IAB donor (e.g., a first base station 110, a first IAB donor 405, and/or the like).

As further shown in FIG. 6, in some aspects, process 600 may include providing the cell configuration associated with the second IAB donor (block 620). For example, the IAB node (e.g., using transmit processor 220, receive processor 238, controller/processor 240, memory 242, and/or the like) may provide the cell configuration associated with the second IAB donor, as described above.

Process 600 may include additional aspects, such as any single aspect or any combination of aspects described below and/or in connection with one or more other processes described elsewhere herein.

In a first aspect, the first signaling connection is a connection over an F1 interface.

In a second aspect, alone or in combination with the first aspect, the first signaling connection is a radio resource control connection.

In a third aspect, alone or in combination with one or more of the first and second aspects, the cell configuration is determined based at least in part on the cell configuration being received from a CU of the second IAB donor on a second signaling connection, the cell configuration being received by the DU or by another DU of the set of DUs.

In a fourth aspect, alone or in combination with one or more of the first through third aspects, the second signaling connection is a connection over an F1 interface.

In a fifth aspect, alone or in combination with one or more of the first through fourth aspects, the second signaling connection is a radio resource control connection.

In a sixth aspect, alone or in combination with one or more of the first through fifth aspects, the cell configuration is received from the CU of the second IAB donor based at least in part on a request provided to the CU of the second IAB donor on the second signaling connection.

In a seventh aspect, alone or in combination with one or more of the first through sixth aspects, the cell configuration is determined based at least in part on the cell configuration being received from the CU of the first IAB donor, the cell configuration being received by the DU or by another DU of the set of DUs.

In an eighth aspect, alone or in combination with one or more of the first through seventh aspects, the cell configuration is received from the CU of the first IAB donor based at least in part on a request provided to the CU of the first IAB donor on the first signaling connection.

In a ninth aspect, alone or in combination with one or more of the first through eighth aspects, the cell configuration is determined based at least in part on the cell configuration being configured on the IAB node by a network operator.

In a tenth aspect, alone or in combination with one or more of the first through ninth aspects, the cell configuration is associated with one or more cells served by the DU.

In an eleventh aspect, alone or in combination with one or more of the first through tenth aspects, the cell configuration is associated with one or more cells activated by the second IAB donor on the DU.

In a twelfth aspect, alone or in combination with one or more of the first through eleventh aspects, the cell configuration includes a cell global identity that includes an identifier of the second IAB donor.

In a thirteenth aspect, alone or in combination with one or more of the first through twelfth aspects, the cell configuration includes a physical cell identifier associated with a cell served by the DU or activated on the DU.

In a fourteenth aspect, alone or in combination with one or more of the first through thirteenth aspects, the cell configuration includes mapping information associated with mapping a cell global identity or a physical cell identifier to a cell associated with the first IAB donor and served by a particular DU of the IAB node, the particular DU being the DU or another DU of the set of DUs.

In a fifteenth aspect, alone or in combination with one or more of the first through fourteenth aspects, the cell configuration includes mapping information associated with mapping a cell global identity or a physical cell identifier to a cell associated with the first IAB donor and activated by the CU of the first IAB donor on a particular DU of the IAB node, the particular DU being the DU or another DU of the set of DUs.

In a sixteenth aspect, alone or in combination with one or more of the first through fifteenth aspects, the cell configuration includes activation status information associated with one or more cells served by the DU.

In a seventeenth aspect, alone or in combination with one or more of the first through sixteenth aspects, the cell configuration includes cell information associated with a cell served by or activated on the DU, the cell information associated with the cell including at least one of a public land mobile network identifier, an area code associated with the cell, a frequency associated with the cell, a bandwidth associated with the cell, a direction associated with the cell, a size associated with the cell, a mode associated with the cell, a time-division duplexing configuration associated with the cell, a measurement timing configuration associated with the cell, access information associated with the cell, or connectivity support information associated with the cell.

In an eighteenth aspect, alone or in combination with one or more of the first through seventeenth aspects, the cell configuration is based at least in part on another cell configuration associated with the first IAB donor and is determined based at least in part on the cell configuration being received from a CU of the second IAB donor.

In a nineteenth aspect, alone or in combination with one or more of the first through eighteenth aspects, the other cell configuration is received from the CU of the first IAB donor on the first signaling connection.

In a twentieth aspect, alone or in combination with one or more of the first through nineteenth aspects, the other cell configuration is provided to the CU of the second IAB donor.

In a twenty-first aspect, alone or in combination with one or more of the first through twentieth aspects, the other cell configuration is provided based at least in part on establishment of a second signaling connection with the second IAB donor.

In a twenty-second aspect, alone or in combination with one or more of the first through twenty-first aspects, the cell configuration is based at least in part on a cell mapping associated with the other cell configuration.

In a twenty-third aspect, alone or in combination with one or more of the first through twenty-second aspects, the cell configuration is based at least in part on changing a physical cell identifier included in the other cell configuration.

In a twenty-fourth aspect, alone or in combination with one or more of the first through twenty-third aspects, the cell configuration includes a physical cell identifier included in the other cell configuration.

In a twenty-fifth aspect, alone or in combination with one or more of the first through twenty-fourth aspects, the cell configuration is provided to the CU of the first IAB donor on the first signaling connection.

In a twenty-sixth aspect, alone or in combination with one or more of the first through twenty-fifth aspects, the cell configuration is provided based at least in part on establishment of a second signaling connection with the second IAB donor.

In a twenty-seventh aspect, alone or in combination with one or more of the first through twenty-sixth aspects, the cell configuration is provided based at least in part on an addition, a deletion, or a change of a configuration of a cell associated with the second IAB donor.

In a twenty-eighth aspect, alone or in combination with one or more of the first through twenty-seventh aspects, the cell configuration is provided based at least in part on a request received from the CU of the first IAB donor.

In a twenty-ninth aspect, alone or in combination with one or more of the first through twenty eighth aspects, the cell configuration is provided based at least in part on a configuration provided by the CU of the first IAB donor.

In a thirtieth aspect, alone or in combination with one or more of the first through twenty-ninth aspects, the cell configuration is provided to a CU of the second IAB donor on a second signaling connection.

In a thirty-first aspect, alone or in combination with one or more of the first through thirtieth aspects, the cell configuration is to be used in association with a context transfer, associated with a child of the IAB node, from the first IAB donor to the second IAB donor based at least in part on the cell configuration.

In a thirty-second aspect, alone or in combination with one or more of the first through thirty first aspects, the context transfer includes a handover.

In a thirty-third aspect, alone or in combination with one or more of the first through thirty-second aspects, the context transfer includes addition of the second IAB donor as a secondary node, the first IAB donor being a master node.

In a thirty-fourth aspect, alone or in combination with one or more of the first through thirty-third aspects, the context transfer includes changing a secondary node from the first IAB donor to the second IAB donor.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
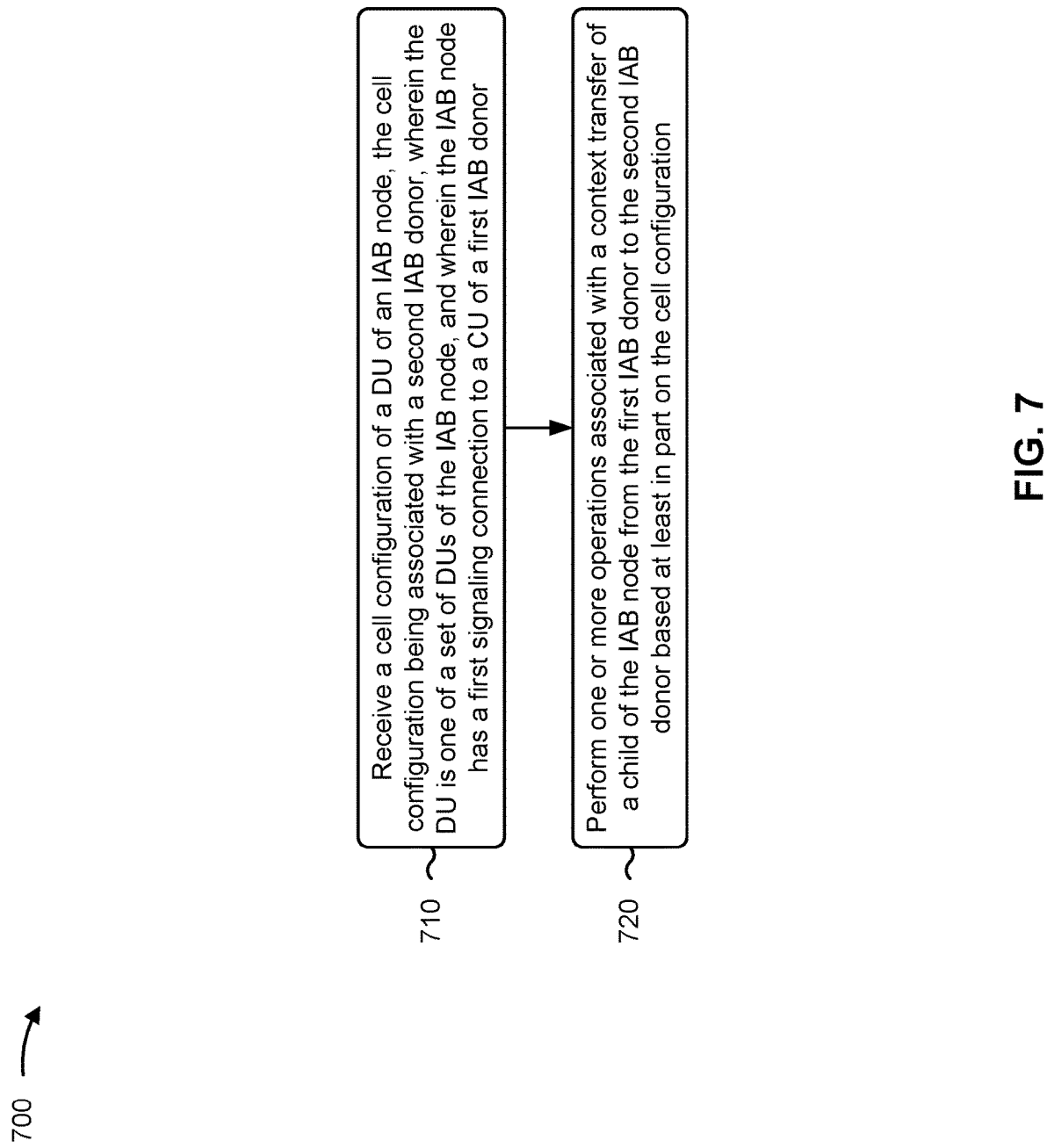
FIG. 7 is a diagram illustrating an example process performed, for example, by an IAB donor, in accordance with the present disclosure.

FIG. 7 is a diagram illustrating an example process 700 performed, for example, by an IAB donor, in accordance with the present disclosure. Example process 700 is an example where the IAB donor (e.g., a base station 110, an IAB donor 405, and/or the like) performs operations associated with inter-donor cell management in IAB.

As shown in FIG. 7, in some aspects, process 700 may include receiving a cell configuration of a DU of an IAB node, the cell configuration being associated with a second IAB donor, wherein the DU is one of a set of DUs of the IAB node, and wherein the IAB node has a first signaling connection to a CU of a first IAB donor (block 710). For example, the IAB donor (e.g., using transmit processor 220, receive processor 238, controller/processor 240, memory 242, and/or the like) may receive a cell configuration of a DU of an IAB node (e.g., a base station 110, an IAB node 410, and/or the like), the cell configuration being associated with a second IAB donor (e.g., a second base station 110, a second IAB donor 405, and/or the like), as described above. In some aspects, the DU is one of a set of DUs of the IAB node. In some aspects, the IAB node has a first signaling connection to a CU of a first IAB donor (e.g., a first base station 110, a first IAB donor 405, and/or the like).

As further shown in FIG. 7, in some aspects, process 700 may include performing one or more operations associated with a context transfer, associated with a child of the IAB node, from the first IAB donor to the second IAB donor based at least in part on the cell configuration (block 720). For example, the base station (e.g., using transmit processor 220, receive processor 238, controller/processor 240, memory 242, and/or the like) may perform one or more operations associated with a context transfer, associated with a child of the IAB node, from the first IAB donor to the second IAB donor based at least in part on the cell configuration, as described above.

Process 700 may include additional aspects, such as any single aspect or any combination of aspects described below and/or in connection with one or more other processes described elsewhere herein.

In a first aspect, the IAB donor is the first IAB donor, and the cell configuration is received on the first signaling connection.

In a second aspect, alone or in combination with the first aspect, the first signaling connection is a connection over an F1 interface.

In a third aspect, alone or in combination with one or more of the first and second aspects, the first signaling connection is a radio resource control connection.

In a fourth aspect, alone or in combination with one or more of the first through third aspects, the IAB donor is the second IAB donor, and the cell configuration is received on a second signaling connection.

In a fifth aspect, alone or in combination with one or more of the first through fourth aspects, the second signaling connection is a connection over an F1 interface.

In a sixth aspect, alone or in combination with one or more of the first through fifth aspects, the second signaling connection is a radio resource control connection.

In a seventh aspect, alone or in combination with one or more of the first through sixth aspects, the cell configuration is received from the DU or from another DU of the set of DUs.

In an eighth aspect, alone or in combination with one or more of the first through seventh aspects, the cell configuration is associated with one or more cells served by the DU.

In a ninth aspect, alone or in combination with one or more of the first through eighth aspects, the cell configuration is associated with one or more cells activated by the second IAB donor on the DU.

In a tenth aspect, alone or in combination with one or more of the first through ninth aspects, the cell configuration includes a cell global identity that includes an identifier of the second IAB donor.

In an eleventh aspect, alone or in combination with one or more of the first through tenth aspects, the cell configuration includes a physical cell identifier associated with a cell served by the DU or activated on the DU.

In a twelfth aspect, alone or in combination with one or more of the first through eleventh aspects, the cell configuration includes mapping information associated with mapping a cell global identity or a physical cell identifier to a cell associated with the first IAB donor and served by a particular DU of the IAB node, the particular DU being the DU or another DU of the set of DUs.

In a thirteenth aspect, alone or in combination with one or more of the first through twelfth aspects, the cell configuration includes mapping information associated with mapping a cell global identity or a physical cell identifier to a cell associated with the first IAB donor and activated by the CU of the first IAB donor on a particular DU of the IAB node, the particular DU being the DU or another DU of the set of DUs.

In a fourteenth aspect, alone or in combination with one or more of the first through thirteenth aspects, the cell configuration includes activation status information associated with one or more cells served by the DU.

In a fifteenth aspect, alone or in combination with one or more of the first through fourteenth aspects, the cell configuration includes cell information associated with a cell served by or activated on the DU, the cell information associated with the cell including at least one of a public land mobile network identifier, an area code associated with the cell, a frequency associated with the cell, a bandwidth associated with the cell, a direction associated with the cell, a size associated with the cell, a mode associated with the cell, a time-division duplexing configuration associated with the cell, a measurement timing configuration associated with the cell, access information associated with the cell, or connectivity support information associated with the cell.

In a sixteenth aspect, alone or in combination with one or more of the first through fifteenth aspects, the cell configuration is based at least in part on another cell configuration associated with the first IAB donor.

In a seventeenth aspect, alone or in combination with one or more of the first through sixteenth aspects, the IAB donor is the first IAB donor, and the other cell configuration is provided by the CU of the first IAB donor on the first signaling connection.

In an eighteenth aspect, alone or in combination with one or more of the first through seventeenth aspects, the IAB donor is the second IAB donor, and the other cell configuration is received by a CU of the second IAB donor on a second signaling connection.

In a nineteenth aspect, alone or in combination with one or more of the first through eighteenth aspects, the other cell configuration is received based at least in part on establishment of the second signaling connection.

In a twentieth aspect, alone or in combination with one or more of the first through nineteenth aspects, the cell configuration is based at least in part on a cell mapping associated with the other cell configuration.

In a twenty-first aspect, alone or in combination with one or more of the first through twentieth aspects, the cell configuration is based at least in part on changing a physical cell identifier included in the other cell configuration.

In a twenty-second aspect, alone or in combination with one or more of the first through twenty-first aspects, the cell configuration includes a physical cell identifier included in the other cell configuration.

In a twenty-third aspect, alone or in combination with one or more of the first through twenty-second aspects, the IAB donor is the first IAB donor, and the cell configuration is received based at least in part on establishment of a second signaling connection with the second IAB donor.

In a twenty-fourth aspect, alone or in combination with one or more of the first through twenty-third aspects, the IAB donor is the first IAB donor, and the cell configuration is received based at least in part on an addition, a deletion, or a change of a configuration of a cell associated with the second IAB donor.

In a twenty-fifth aspect, alone or in combination with one or more of the first through twenty-fourth aspects, the IAB donor is the first IAB donor, and the cell configuration is received based at least in part on based at least in part on a request provided from the CU of the first IAB donor.

In a twenty-sixth aspect, alone or in combination with one or more of the first through twenty-fifth aspects, the IAB donor is the first IAB donor, and the cell configuration is received based at least in part on a configuration provided by the CU of the first IAB donor.

In a twenty-seventh aspect, alone or in combination with one or more of the first through twenty-sixth aspects, the context transfer includes a handover.

In a twenty-eighth aspect, alone or in combination with one or more of the first through twenty-seventh aspects, the context transfer includes addition of the second IAB donor as a secondary node, the first IAB donor being a master node.

In a twenty-ninth aspect, alone or in combination with one or more of the first through twenty-eighth aspects, the context transfer includes changing a secondary node from the first IAB donor to the second IAB donor.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

The following provides an overview of some Aspects of the present disclosure:

Aspect 1: A method of wireless communication performed by an integrated access and backhaul (IAB) node, comprising: determining a cell configuration of a distributed unit (DU) of the IAB node, the cell configuration being associated with a second IAB donor, wherein the DU is one of a set of DUs of the IAB node, and wherein the IAB node has a first signaling connection to a central unit (CU) of a first IAB donor; and providing the cell configuration associated with the second IAB donor.

Aspect 2: The method of Aspect 1, wherein the first signaling connection is a connection over an F1 interface.

Aspect 3: The method of Aspect 1, wherein the first signaling connection is a radio resource control connection.

Aspect 4: The method of any of Aspects 1-3, wherein the cell configuration is determined based at least in part on the cell configuration being received from a CU of the second IAB donor on a second signaling connection, the cell configuration being received by the DU or by another DU of the set of DUs.

Aspect 5: The method of Aspect 4, wherein the second signaling connection is a connection over an F1 interface.

Aspect 6: The method of Aspect 4, wherein the second signaling connection is a radio resource control connection.

Aspect 7: The method of any of Aspects 4-6, wherein the cell configuration is received from the CU of the second IAB donor based at least in part on a request provided to the CU of the second IAB donor on the second signaling connection.

Aspect 8: The method of any of Aspects 1-3, wherein the cell configuration is determined based at least in part on the cell configuration being received from the CU of the first IAB donor, the cell configuration being received by the DU or by another DU of the set of DUs.

Aspect 9: The method of Aspect 8, wherein the cell configuration is received from the CU of the first IAB donor based at least in part on a request provided to the CU of the first IAB donor on the first signaling connection.

Aspect 10: The method of any of Aspects 1-3, wherein the cell configuration is determined based at least in part on the cell configuration being configured on the IAB node by a network operator.

Aspect 11: The method of any of Aspects 1-10, wherein the cell configuration is associated with one or more cells served by the DU.

Aspect 12: The method of any of Aspects 1-11, wherein the cell configuration is associated with one or more cells activated by the second IAB donor on the DU.

Aspect 13: The method of any of Aspects 1-12, wherein the cell configuration includes a cell global identity that includes an identifier of the second IAB donor.

Aspect 14: The method of any of Aspects 1-13, wherein the cell configuration includes a physical cell identifier associated with a cell served by the DU or activated on the DU.

Aspect 15: The method of any of Aspects 1-14, wherein the cell configuration includes mapping information associated with mapping a cell global identity or a physical cell identifier to a cell associated with the first IAB donor and served by a particular DU of the IAB node, the particular DU being the DU or another DU of the set of DUs.

Aspect 16: The method of any of Aspects 1-15, wherein the cell configuration includes mapping information associated with mapping a cell global identity or a physical cell identifier to a cell associated with the first IAB donor and activated by the CU of the first IAB donor on a particular DU of the IAB node, the particular DU being the DU or another DU of the set of DUs.

Aspect 17: The method of any of Aspects 1-16, wherein the cell configuration includes activation status information associated with one or more cells served by the DU.

Aspect 18: The method of any of Aspects 1-17, wherein the cell configuration includes cell information associated with a cell served by or activated on the DU, the cell information associated with the cell including at least one of: a public land mobile network identifier, an area code associated with the cell, a frequency associated with the cell, a bandwidth associated with the cell, a direction associated with the cell, a size associated with the cell, a mode associated with the cell, a time-division duplexing configuration associated with the cell, a measurement timing configuration associated with the cell, access information associated with the cell, or connectivity support information associated with the cell.

Aspect 19: The method of any of Aspects 1-18, wherein the cell configuration is based at least in part on another cell configuration associated with the first IAB donor and is determined based at least in part on the cell configuration being received from a CU of the second IAB donor.

Aspect 20: The method of Aspect 19, wherein the other cell configuration is received from the CU of the first IAB donor on the first signaling connection.

Aspect 21: The method of any of Aspects 19-20, wherein the other cell configuration is provided to the CU of the second IAB donor.

Aspect 22: The method of Aspect 21, wherein the other cell configuration is provided based at least in part on establishment of a second signaling connection with the second IAB donor.

Aspect 23: The method of any of Aspects 19-22, wherein the cell configuration is based at least in part on a cell mapping of cell global identities or physical cell identifiers associated with the other cell configuration.

Aspect 24: The method of any of Aspects 19-23, wherein the cell configuration is based at least in part on changing a physical cell identifier included in the other cell configuration.

Aspect 25: The method of any of Aspects 19-24, wherein the cell configuration includes a physical cell identifier included in the other cell configuration.

Aspect 26: The method of any of Aspects 1-25, wherein the cell configuration is provided to the CU of the first IAB donor on the first signaling connection.

Aspect 27: The method of Aspect 26, wherein the cell configuration is provided based at least in part on establishment of a second signaling connection with the second IAB donor.

Aspect 28: The method of any of Aspects 26-27, wherein the cell configuration is provided based at least in part on an addition, a deletion, or a change of a configuration of a cell associated with the second IAB donor.

Aspect 29: The method of any of Aspects 26-28, wherein the cell configuration is provided based at least in part on a request received from the CU of the first IAB donor.

Aspect 30: The method of any of Aspects 26-29, wherein the cell configuration is provided based at least in part on a configuration provided by the CU of the first IAB donor.

Aspect 31: The method of any of Aspects 1-30, wherein the cell configuration is provided to a CU of the second IAB donor on a second signaling connection.

Aspect 32: The method of any of Aspects 1-31, wherein the cell configuration is to be used in association with a context transfer, associated with a child of the IAB node, from the first IAB donor to the second IAB donor based at least in part on the cell configuration.

Aspect 33: The method of Aspect 32, wherein the context transfer includes a handover.

Aspect 34: The method of any of Aspects 32-33, wherein the context transfer includes addition of the second IAB donor as a secondary node, the first IAB donor being a master node.

Aspect 35: The method of any of Aspects 32-34, wherein the context transfer includes changing a secondary node from the first IAB donor to the second IAB donor.

Aspect 36: A method of wireless communication performed by an integrated access and backhaul (IAB) donor, comprising: receiving a cell configuration of a distributed unit (DU) of an IAB node, the cell configuration being associated with a second IAB donor, wherein the DU is one of a set of DUs of the IAB node, and wherein the IAB node has a first signaling connection to a central unit (CU) of a first IAB donor; and performing one or more operations associated with a context transfer, associated with a child of the IAB node, from the first IAB donor to the second IAB donor based at least in part on the cell configuration.

Aspect 37: The method of Aspect 36, wherein the IAB donor is the first IAB donor, and the cell configuration is received on the first signaling connection.

Aspect 38: The method of any of Aspects 36-37, wherein the first signaling connection is a connection over an F1 interface.

Aspect 39: The method of any of Aspects 36-37, wherein the first signaling connection is a radio resource control connection.

Aspect 40: The method of any of Aspects 36-39, wherein the IAB donor is the second IAB donor, and the cell configuration is received on a second signaling connection.

Aspect 41: The method of Aspect 40, wherein the second signaling connection is a connection over an F1 interface.

Aspect 42: The method of Aspect 40, wherein the second signaling connection is a radio resource control connection.

Aspect 43: The method of any of Aspects 36-42, wherein the cell configuration is received from the DU or from another DU of the set of DUs.

Aspect 44: The method of any of Aspects 36-43, wherein the cell configuration is associated with one or more cells served by the DU.

Aspect 45: The method of any of Aspects 36-44, wherein the cell configuration is associated with one or more cells activated by the second IAB donor on the DU.

Aspect 46: The method of any of Aspects 36-45, wherein the cell configuration includes a cell global identity that includes an identifier of the second IAB donor.

Aspect 47: The method of any of Aspects 36-46, wherein the cell configuration includes a physical cell identifier associated with a cell served by the DU or activated on the DU.

Aspect 48: The method of any of Aspects 36-47, wherein the cell configuration includes mapping information associated with mapping a cell global identity or a physical cell identifier to a cell associated with the first IAB donor and served by a particular DU of the IAB node, the particular DU being the DU or another DU of the set of DUs.

Aspect 49: The method of any of Aspects 36-48, wherein the cell configuration includes mapping information associated with mapping a cell global identity or a physical cell identifier to a cell associated with the first IAB donor and activated by the CU of the first IAB donor on a particular DU of the IAB node, the particular DU being the DU or another DU of the set of DUs.

Aspect 50: The method of any of Aspects 36-49, wherein the cell configuration includes activation status information associated with one or more cells served by the DU.

Aspect 51: The method of any of Aspects 36-50, wherein the cell configuration includes cell information associated with a cell served by or activated on the DU, the cell information associated with the cell including at least one of: a public land mobile network identifier, an area code associated with the cell, a frequency associated with the cell, a bandwidth associated with the cell, a direction associated with the cell, a size associated with the cell, a mode associated with the cell, a time-division duplexing configuration associated with the cell, a measurement timing configuration associated with the cell, access information associated with the cell, or connectivity support information associated with the cell.

Aspect 52: The method of any of Aspects 36-51, wherein the cell configuration is based at least in part on another cell configuration associated with the first IAB donor.

Aspect 53: The method of Aspect 52, wherein the IAB donor is the first IAB donor, and the other cell configuration is provided by the CU of the first IAB donor on the first signaling connection.

Aspect 54: The method of Aspect 52, wherein the IAB donor is the second IAB donor, and the other cell configuration is received by a CU of the second IAB donor on a second signaling connection.

Aspect 55: The method of Aspect 54, wherein the other cell configuration is received based at least in part on establishment of the second signaling connection.

Aspect 56: The method of any of Aspects 52-55, wherein the cell configuration is based at least in part on a cell mapping of cell global identities or physical cell identifiers associated with the other cell configuration.

Aspect 57: The method of any of Aspects 52-56, wherein the cell configuration is based at least in part on changing a physical cell identifier included in the other cell configuration.

Aspect 58: The method of any of Aspects 52-57, wherein the cell configuration includes a physical cell identifier included in the other cell configuration.

Aspect 59: The method of any of Aspects 36-58, wherein the IAB donor is the first IAB donor, and the cell configuration is received based at least in part on establishment of a second signaling connection with the second IAB donor.

Aspect 60: The method of Aspect any of Aspects 36-59, wherein the IAB donor is the first IAB donor, and the cell configuration is received based at least in part on an addition, a deletion, or a change of a configuration of a cell associated with the second IAB donor.

Aspect 61: The method of any of Aspects 36-60, wherein the IAB donor is the first IAB donor, and the cell configuration is received based at least in part on based at least in part on a request provided from the CU of the first IAB donor.

Aspect 62: The method of any of Aspects 36-61, wherein the IAB donor is the first IAB donor, and the cell configuration is received based at least in part on a configuration provided by the CU of the first IAB donor.

Aspect 63: The method of any of Aspects 36-62, wherein the context transfer includes a handover.

Aspect 64: The method of any of Aspects 36-63, wherein the context transfer includes addition of the second IAB donor as a secondary node, the first IAB donor being a master node.

Aspect 65: The method of any of Aspects 36-64, wherein the context transfer includes changing a secondary node from the first IAB donor to the second IAB donor.

Aspect 66: An apparatus for wireless communication at a device, comprising a processor; memory coupled with the processor; and instructions stored in the memory and executable by the processor to cause the apparatus to perform the method of one or more Aspects of Aspects 1-35.

Aspect 67: A device for wireless communication, comprising a memory and one or more processors coupled to the memory, the memory and the one or more processors configured to perform the method of one or more Aspects of Aspects 1-35.

Aspect 68: An apparatus for wireless communication, comprising at least one means for performing the method of one or more Aspects of Aspects 1-35.

Aspect 69: A non-transitory computer-readable medium storing code for wireless communication, the code comprising instructions executable by a processor to perform the method of one or more Aspects of Aspects 1-35.

Aspect 70: A non-transitory computer-readable medium storing a set of instructions for wireless communication, the set of instructions comprising one or more instructions that, when executed by one or more processors of a device, cause the device to perform the method of one or more Aspects of Aspects 1-35.

Aspect 71: An apparatus for wireless communication at a device, comprising a processor; memory coupled with the processor; and instructions stored in the memory and executable by the processor to cause the apparatus to perform the method of one or more Aspects of Aspects 36-65.

Aspect 73: A device for wireless communication, comprising a memory and one or more processors coupled to the memory, the memory and the one or more processors configured to perform the method of one or more Aspects of Aspects 36-65.

Aspect 73: An apparatus for wireless communication, comprising at least one means for performing the method of one or more Aspects of Aspects 36-65.

Aspect 74: A non-transitory computer-readable medium storing code for wireless communication, the code comprising instructions executable by a processor to perform the method of one or more Aspects of Aspects 36-65.

Aspect 75: A non-transitory computer-readable medium storing a set of instructions for wireless communication, the set of instructions comprising one or more instructions that, when executed by one or more processors of a device, cause the device to perform the method of one or more Aspects of Aspects 36-65.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by an integrated access and backhaul (IAB) node, comprising:
   determining a cell configuration of a first distributed unit (DU) of the IAB node, the cell configuration being associated with a first IAB donor,
      wherein the IAB node includes the first DU and at least one other DU, and
      wherein the at least one other DU of the IAB node has a first signaling connection to a central unit (CU) of a second IAB donor; and
   providing the cell configuration associated with the first IAB donor.

2. The method of claim 1, wherein the first signaling connection is a connection over an F1 interface or is a radio resource control connection.

3. The method of claim 1, wherein the cell configuration is determined based at least in part on the cell configuration being received from a CU of the first IAB donor on a second signaling connection, the cell configuration being received by the first DU or by the at least one other DU.

4. The method of claim 3, wherein the second signaling connection is a connection over an F1 interface or is a radio resource control connection.

5. The method of claim 1, wherein the cell configuration is associated with one or more cells activated by the first IAB donor on the DU or includes activation status information associated with one or more cells served by the DU.

6. The method of claim 1, wherein the cell configuration includes a cell global identity that includes an identifier of the first IAB donor.

7. The method of claim 1, wherein the cell configuration includes mapping information associated with mapping a cell global identity or a physical cell identifier to a cell associated with the second IAB donor and served by a particular DU of the IAB node or activated by the CU of the second IAB donor on the particular DU of the IAB node, the particular DU being the DU, the at least one other DU, or another DU.

8. The method of claim 1, wherein the cell configuration is based at least in part on another cell configuration associated with the second IAB donor and is determined based at least in part on the cell configuration being received from a CU of the first IAB donor.

9. The method of claim 8, wherein the cell configuration is based at least in part on a cell mapping of cell global identities or physical cell identifiers associated with the other cell configuration.

10. The method of claim 1, wherein the cell configuration is provided based at least in part on establishment of a second signaling connection with the first IAB donor.

11. The method of claim 1, wherein the cell configuration is provided based at least in part on a request received from the CU of the second IAB donor.

12. The method of claim 1, wherein the cell configuration is to be used in association with a context transfer, associated with a child of the JAB node, from the second IAB donor to the first IAB donor based at least in part on the cell configuration.

13. The method of claim 12, wherein the context transfer includes at least one of a handover, addition of the first IAB donor as a secondary node with the second IAB donor being a master node, or changing a secondary node from the second IAB donor to the first IAB donor.

14. A method of wireless communication performed by an integrated access and backhaul (JAB) donor, comprising:

receiving a cell configuration of a distributed unit (DU) of an JAB node, the cell configuration being associated with a second IAB donor,
  wherein the DU is one of a set of DUs of the IAB node, the set including the DU and at least one other DU, and
  wherein the at least one other DU of the IAB node has a first signaling connection to a central unit (CU) of a first IAB donor; and
performing one or more operations associated with a context transfer, associated with a child of the IAB node, from the first IAB donor to the second IAB donor based at least in part on the cell configuration.

15. The method of claim 14, wherein the IAB donor is the first IAB donor, and the cell configuration is received on the first signaling connection.

16. The method of claim 14, wherein the first signaling connection is a connection over an F1 interface or is a radio resource control connection.

17. The method of claim 14, wherein the IAB donor is the second IAB donor, and the cell configuration is received on a second signaling connection.

18. The method of claim 14, wherein the IAB donor is the first IAB donor, and the cell configuration is received based at least in part on establishment of a second signaling connection with the second IAB donor.

19. The method of claim 14, wherein the IAB donor is the first IAB donor, and the cell configuration is received based at least in part on a request provided from the CU of the first IAB donor.

20. An integrated access and backhaul (IAB) node for wireless communication, comprising:
  one or more memories; and
  one or more processors coupled to the one or more memories, the one or more processors configured to cause the IAB node to:
    determine a cell configuration of a first distributed unit (DU) of the IAB node, the cell configuration being associated with a first IAB donor,
      wherein the IAB node includes the first DU and at least one other DU, and
      wherein the at least one other DU of the IAB node has a first signaling connection to a central unit (CU) of a second IAB donor; and
    provide the cell configuration associated with the first IAB donor.

21. An integrated access and backhaul (IAB) donor for wireless communication, comprising:
  one or more memories; and
  one or more processors coupled to the one or more memories, the one or more processors configured to cause the IAB donor to:
    receive a cell configuration of a distributed unit (DU) of an IAB node, the cell configuration being associated with a second IAB donor,
      wherein the DU is one of a set of DUs of the IAB node, the set including the DU and at least one other DU, and
      wherein the at least one other DU of the IAB node has a first signaling connection to a central unit (CU) of a first IAB donor; and
    perform one or more operations associated with a context transfer, associated with a child of the IAB node, from the first IAB donor to the second IAB donor based at least in part on the cell configuration.

22. The IAB node of claim 20, wherein the first signaling connection is a connection over an F1 interface or is a radio resource control connection.

23. The IAB node of claim 20, wherein the cell configuration is determined based at least in part on the cell configuration being received from a CU of the first IAB donor on a second signaling connection, the cell configuration being received by the first DU or by the at least one other DU.

24. The IAB node of claim 20, wherein the second signaling connection is a connection over an F1 interface or is a radio resource control connection.

25. The IAB node of claim 20, wherein the cell configuration is associated with one or more cells activated by the first IAB donor on the DU or includes activation status information associated with one or more cells served by the DU.

26. The IAB node of claim 20, wherein the cell configuration includes a cell global identity that includes an identifier of the first IAB donor.

27. The IAB node of claim 20, wherein the cell configuration includes mapping information associated with mapping a cell global identity or a physical cell identifier to a cell associated with the second IAB donor and served by a particular DU of the IAB node or activated by the CU of the second IAB donor on the particular DU of the IAB node, the particular DU being the DU, the at least one other DU, or another DU.

28. The IAB node of claim 20, wherein the cell configuration is based at least in part on another cell configuration associated with the second IAB donor and is determined based at least in part on the cell configuration being received from a CU of the first IAB donor.

29. The IAB node of claim 28, wherein the cell configuration is based at least in part on a cell mapping of cell global identities or physical cell identifiers associated with the other cell configuration.

30. The IAB node of claim 20, wherein the cell configuration is provided based at least in part on establishment of a second signaling connection with the first IAB donor.

31. The IAB node of claim 20, wherein the cell configuration is provided based at least in part on a request received from the CU of the second IAB donor.

32. The IAB node of claim 20, wherein the cell configuration is to be used in association with a context transfer, associated with a child of the IAB node, from the second IAB donor to the first IAB donor based at least in part on the cell configuration.

33. The IAB node of claim 32, wherein the context transfer includes at least one of a handover, addition of the first IAB donor as a secondary node with the second IAB donor being a master node, or changing a secondary node from the second IAB donor to the first IAB donor.

* * * * *